United States Patent
Nagai

(10) Patent No.: US 8,434,535 B2
(45) Date of Patent: May 7, 2013

(54) PNEUMATIC TIRE WITH TREAD HAVING CIRCUMFERENTIAL AUXILIARY GROOVES

(75) Inventor: Hitoshi Nagai, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 770 days.

(21) Appl. No.: 12/527,094

(22) PCT Filed: Jan. 30, 2008

(86) PCT No.: PCT/JP2008/051437
§ 371 (c)(1),
(2), (4) Date: Aug. 13, 2009

(87) PCT Pub. No.: WO2008/099677
PCT Pub. Date: Aug. 21, 2008

(65) Prior Publication Data
US 2010/0096053 A1   Apr. 22, 2010

(30) Foreign Application Priority Data
Feb. 16, 2007   (JP) ................. 2007-036266

(51) Int. Cl.
*B60C 11/13*   (2006.01)

(52) U.S. Cl.
USPC ............... 152/209.8; 152/209.9; 152/209.24; 152/209.27

(58) Field of Classification Search ............... 152/209.8, 152/209.9, 209.15, 209.24, 209.27, DIG. 3
See application file for complete search history.

(56) References Cited

U.S. PATENT DOCUMENTS

| | | | | |
|---|---|---|---|---|
| 4,299,264 A | * | 11/1981 | Williams | 152/209.24 |
| 4,456,046 A | * | 6/1984 | Miller | 152/209.18 |
| 4,905,748 A | * | 3/1990 | Kukimoto et al. | 152/209.9 |
| 5,529,101 A | * | 6/1996 | Croyle et al. | 152/209.24 |

FOREIGN PATENT DOCUMENTS

| | | | | |
|---|---|---|---|---|
| JP | 60-193704 A | * | 10/1985 | |
| JP | 61-098601 A | * | 5/1986 | |
| JP | 04-143105 A | | 5/1992 | |
| JP | 09-132008 A | | 5/1997 | |
| JP | 2000-233606 A | * | 8/2000 | |
| JP | 2001-191740 A | | 7/2001 | |
| JP | 2004-026141 A | | 1/2004 | |
| JP | 2005-041426 A | | 2/2005 | |
| JP | 2005-126007 A | | 5/2005 | |

OTHER PUBLICATIONS

Machine translation for Japan 2000-233606 (no date).*
Translation for Japan 60-193704 (no date).*
International Search Report of PCT/JP2008/051437 dated Apr. 15, 2008.
Supplementary European Search Report dated Mar. 29, 2010 (5 pages).

* cited by examiner

*Primary Examiner* — Steven D Maki
(74) *Attorney, Agent, or Firm* — Sughrue Mion, PLLC

(57) ABSTRACT

A pneumatic tire 10 in which a plurality of circumferential main grooves 11 that extend in the tire circumferential direction are formed in a tread surface portion, and a plurality of land portion rows 14 are partitioned by the circumferential main grooves 11, in which in at least one of the plurality of the land portion rows 14 a circumferential auxiliary groove 15 extending in the tire circumferential direction and having a narrower width and shallower depth than those of the circumferential main grooves 11 is formed in a position avoiding the tire centerline CL, and among both side faces 15a and 15b defining the circumferential auxiliary groove 15, one side face on the tire centerline side extends along the normal direction of the tread surface portion or is inclined to the tire centerline side by 5° or less with respect to the normal direction, and the other side face on the side opposite to the tire centerline side is inclined to the side opposite to the tire centerline side by 10° to 30° with respect to the normal direction. In accordance with the present invention, it is possible to improve the turning performance on snowy roads without decreasing the steering stability or quietness during travel on a dry road surface.

3 Claims, 3 Drawing Sheets

PNEUMATIC TIRE WITH TREAD HAVING CIRCUMFERENTIAL AUXILIARY GROOVES

TECHNICAL FIELD

The present invention relates to a pneumatic tire.

Priority is claimed on Japanese Patent Application No. 2007-36266, filed Feb. 16, 2007, the content of which is incorporated herein by reference.

BACKGROUND ART

To improve travel performance on snowy roads, various improvements have conventionally been proposed, such as that disclosed for example in Patent Document 1. In recent years, in order to suppress sideways sliding of a pneumatic tire during turning, that is, improve turning performance, among various travel performances on snowy roads, the following improvements have been studied. Reducing the ground contact area of the tread surface portion and reducing the rigidity of a land portion row that is formed in the tread surface portion by increasing the width dimension or depth dimension of the circumferential main groove formed in the tread surface portion or the number thereof have been studied.
[Patent Document 1] Japanese Unexamined Patent Application, First Publication No. 2001-191740

DISCLOSURE OF THE INVENTION

Problem to be Solved by the Invention

However, in this pneumatic tire, there was the risk of the operational stability or quietness decreasing during travel on a dry road surface.

The present invention was achieved in view of the above circumstances, and has as its object to provide a pneumatic tire that is capable of improving the turning performance on snowy roads without decreasing the steering stability or quietness during travel on a dry road surface.

Means for Solving the Problem

In order to solve the aforementioned issues and achieve such an object, the pneumatic tire of the present invention is a pneumatic tire in which a plurality of circumferential main grooves that extend in the tire circumferential direction are formed in a tread surface portion, and a plurality of land portion rows are partitioned by the circumferential main grooves. In the pneumatic tire, in at least one of the plurality of the land portion rows a circumferential auxiliary groove extending in the tire circumferential direction and having a narrower width and shallower depth than those of the circumferential main grooves is formed in a position avoiding the tire centerline.

Among both side faces defining the circumferential auxiliary groove, one side face on the tire centerline side extends along the normal direction of the tread surface portion or is inclined to the tire centerline side by 5° or less with respect to the normal direction. The other side face on the side opposite to the tire centerline side is inclined to the side opposite to the tire centerline side by 10° to 30° with respect to the normal direction.

In the present invention, during turning travel on a snowy road, by making the snow enter the circumferential auxiliary groove from the other side face side and not causing this snow to pass from the one side face to the outer side, easily pressing the snow against the one side face becomes possible, and it becomes possible to easily fill the circumferential auxiliary groove with snow and harden it. Accordingly, during turning on a snowy road, at the snow surface with which the tread surface portion makes contact, it becomes possible to form a snow pillar that bites into the circumferential auxiliary groove, and it is possible to raise the grip force of the tread surface portion with respect to the snowy road.

Moreover, the circumferential auxiliary groove is provided with the side faces, and the width of the circumferential auxiliary groove gradually narrows from the tread surface portion to the bottom face. Accordingly, the snow that enters as described above is compressed and hardened in the process of penetrating toward the bottom face, and so hardening the snow pillar becomes possible and it is possible to reliably increase the grip force.

Moreover, the circumferential auxiliary groove is provided with the side faces in this manner, and the width of this circumferential auxiliary groove gradually increases from the bottom face to the tread surface portion. Accordingly, by causing for example centrifugal force or the like to act on the snow pillar that bites into this circumferential auxiliary groove when the tread surface portion has separated from the snowy road, it becomes possible to easily extract the snow pillar from the circumferential auxiliary groove. Therefore, it becomes possible to prevent the circumferential auxiliary groove from easily clogging, and so even during travel on a snowy road over a long period, the aforementioned effect is continuously exhibited during this travel.

Furthermore, since the circumferential auxiliary groove is provided with the other side face, by forming the circumferential auxiliary groove in the land portion row of the tread surface portion, along with becoming possible to suppress a reduction in the rigidity of this land portion row, the following effects can be obtained. Because the shear strength at the coupling portion of the snow pillar with the snow surface is efficiently raised without excessively enlarging the volume of the circumferential auxiliary groove, even if the reduction in the ground contact area of the tread surface portion with a dry road surface is suppressed by limiting the number of the circumferential auxiliary grooves and making the width dimension and depth dimension thereof smaller than the circumferential main groove, the aforementioned effect can be exhibited.

Thereby, it is possible to improve the turning performance on snowy roads without reducing the steering stability or quietness during travel on a dry road surface.

Note that when the one side face of the circumferential auxiliary groove is inclined to the side opposite to the tire centerline side, the rigidity of the portion in the land portion row that continues to this one side face becomes small, leading to a risk of a reduction in steering stability or quietness during travel on a dry road surface. When the one side face is inclined to the tire centerline side by more than 5° with respect to the normal direction, snow that has entered the circumferential auxiliary groove from the other side face side easily passes from the one side face to the outer side, giving rise to the risk of causing a snow pillar to bite into the circumferential auxiliary groove becoming difficult.

Moreover, when the other side face of the circumferential auxiliary groove is inclined to the side opposite to the tire centerline side by less than 10° with respect to the normal direction, making snow enter the circumferential auxiliary groove becomes difficult. When the other side face is inclined to the side opposite to the tire centerline side by more than 30° with respect to the normal direction, the ground contact area of the tread surface portion with the dry road surface decreases, giving rise to the risk of a decrease in the steering stability or quietness during travel on a dry road surface.

Here, in addition to the installation direction to a vehicle being clearly indicated, a tread pattern formed by the circumferential main grooves and lateral grooves on the tread surface portion is asymmetrical about the tire centerline. Among the plurality of land portion rows, the circumferential auxiliary groove may be formed in at least an outer side land portion row that is disposed on the vehicle outer side of the tire centerline.

In this case, since the circumferential auxiliary groove is formed in the outer side land portion row that most easily slips sideways in the tread surface portion during turning on a snowy road, the aforementioned effect is prominently exhibited.

Note that when the above pneumatic tire is attached to driven wheels to which chains are not attached during travel on a snowy road, the aforementioned effect is even more prominently exhibited.

Effect of the Invention

With this invention, it is possible to improve the turning performance on snowy roads without decreasing the steering stability or quietness during travel on a dry road surface.

Figure 1:
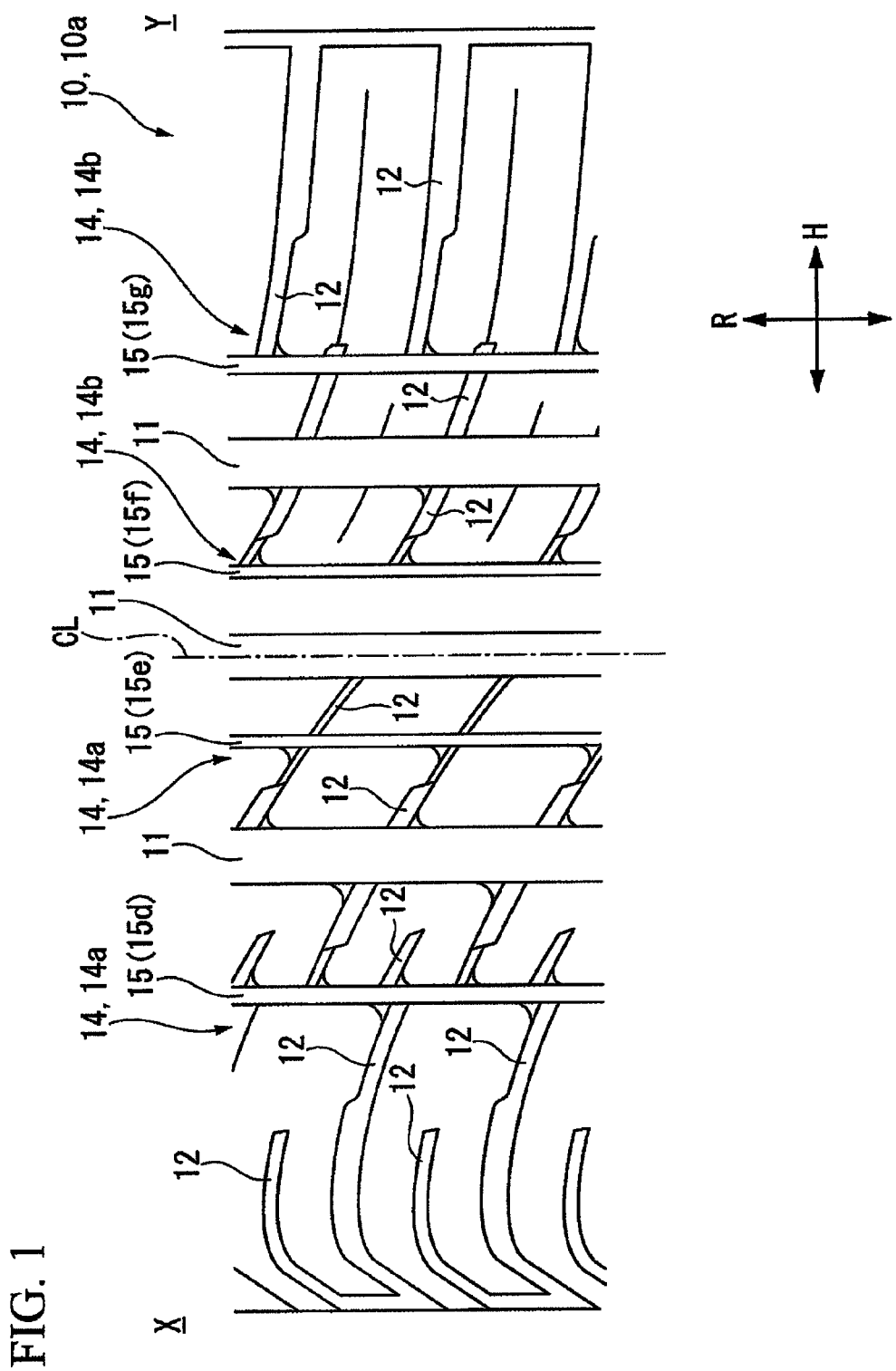
FIG. 1 is a plan view that shows a portion of the tread surface of the pneumatic tire in one embodiment in accordance with the present invention.

BRIEF DESCRIPTION OF THE REFERENCE NUMERALS 10 pneumatic tire
10a tread surface portion
11 circumferential main groove
14 land portion row
14a outer side land portion row
14b inner side land portion row
15 circumferential auxiliary groove
15a one side surface
15b another side surface
CL tire centerline
H tire width direction
R tire circumferential direction

BEST MODE FOR CARRYING OUT THE INVENTION

Figure 2:
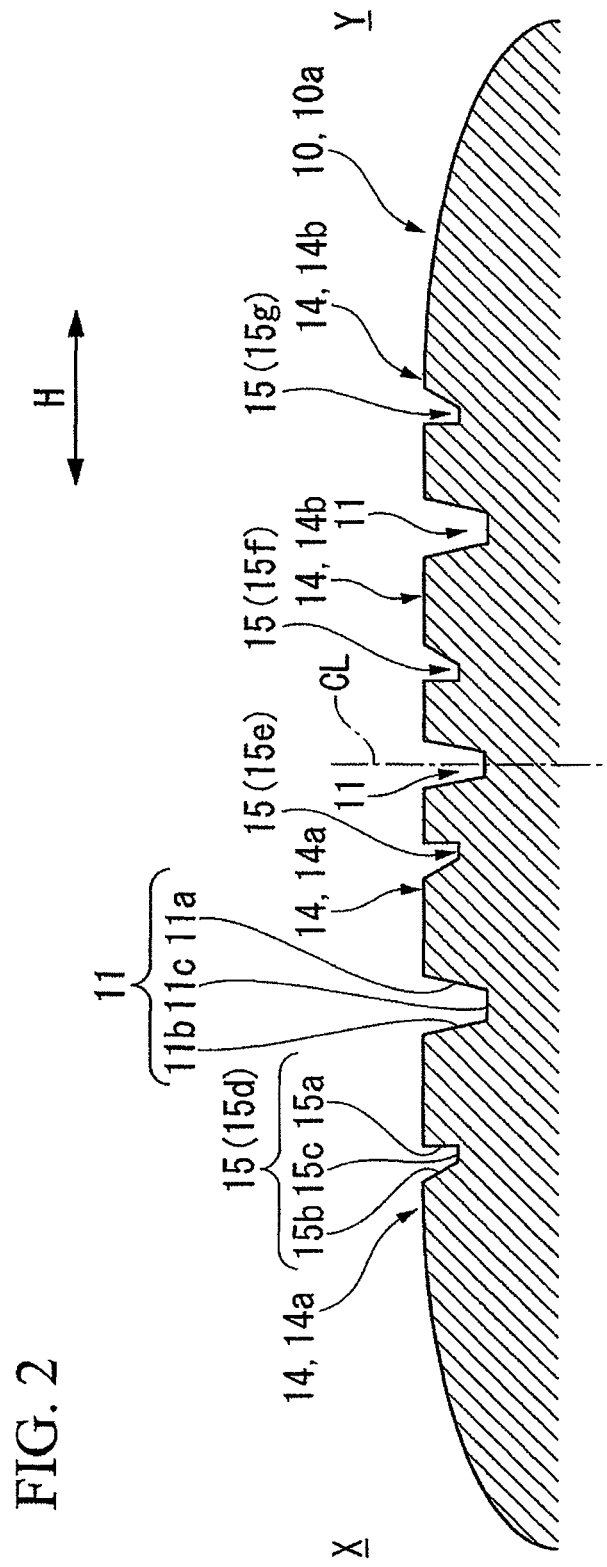
FIG. 2 is a partial sectional view of the pneumatic tire shown in FIG. 1.
Figure 3:
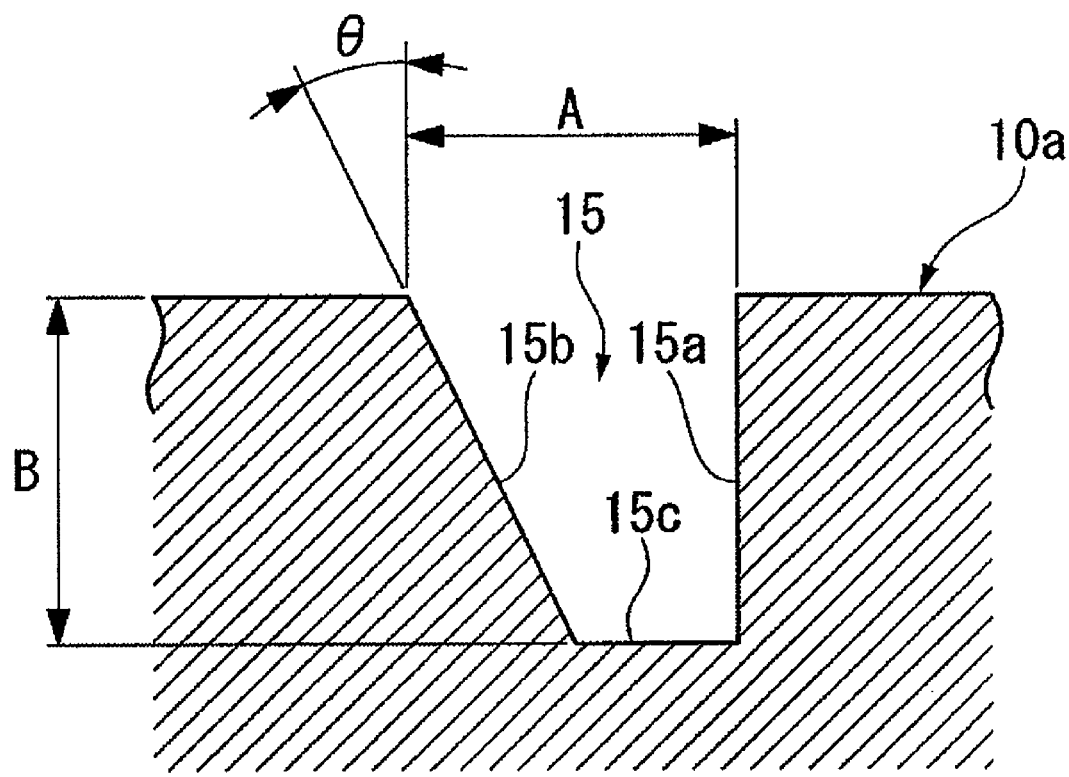
FIG. 3 is a partially enlarged view of the pneumatic tire shown in FIG. 2.

Hereinbelow, an embodiment of a pneumatic tire in accordance with the present invention shall be described with reference to FIG. 1 to FIG. 3. A plurality of circumferential main grooves 11 that extend in the tire circumferential direction R are formed with a mutual interval in the tire width direction H in a tread surface portion 10a of this pneumatic tire 10, and a plurality of land portion rows 14 are demarcated by these circumferential main grooves 11.

In the illustrated example, three circumferential main grooves 11 are formed, with one of them arranged so that the center portion thereof in the width direction is positioned on the tire centerline CL, and the other two arranged so as to be separated by the same distance from the tire centerline CL on the vehicle outer side X and the vehicle inner side Y, respectively. Thereby, four land portion rows 14 are arranged at positions separate from the tire centerline CL on the tread surface portion 10a. Specifically, among the four land portion rows 14, two are positioned on the vehicle outer side X of the tire center line CL, and the remaining two are arranged on the vehicle inner side Y of the tire centerline CL. Note that among the plurality of circumferential main grooves 11, the width of the center circumferential main groove 11 whose center portion in the width direction is positioned on the tire centerline CL is narrower than the other circumferential main grooves 11.

Moreover, in the illustrated example, lateral grooves 12 that extend in the tire width direction H are formed in the plurality of land portion rows 14 at a mutual interval in the tire circumferential direction R.

A tread pattern is thus formed in the tread surface portion 10a by the above circumferential main grooves 11 and the lateral grooves 12. In the present embodiment, this tread pattern is asymmetrical about the tire centerline CL. Moreover, an indication not illustrated of the installation direction to a vehicle is provided on the outer surface of this pneumatic tire 10.

Note that this pneumatic tire 10 has a left-right pair of bead portions, a tread portion having the tread surface portion 10a that is arranged outward of the bead portions in the tire radial direction, and a left-right pair of sidewalls that connect both end portions of this tread portion in the tire width direction and the outward ends of the bead portions in the tire radius direction. A carcass layer is provided in the inner portion of the bead portion, the sidewall and the tread portion, extending in a continuous manner across these portions.

In the present embodiment, a circumferential auxiliary groove 15 with a width that is narrower and a depth that is shallower than the circumferential main groove 11 is formed in at least one of the plurality of land portion rows 14 in a manner extending in the tire circumferential direction R. In the illustrated example, among the plurality of land portion rows 14 provided on the tread surface portion 10a, irrespective of the two outer side land portion rows 14a disposed on the vehicle outer side X of the tire centerline CL and the two inner side land portion rows 14b disposed on the vehicle inner side Y of the tire centerline CL, in a one-to-one manner with the total of four land portion rows 14, that is, a total of four circumferential auxiliary grooves 15 (15d to 15g) are formed on the tread surface portion 10a.

Also, among the two circumferential auxiliary grooves 15d and 15e that are formed on the vehicle outer side X of the tire centerline CL and among the two circumferential auxiliary grooves 15f and 15g that are formed on the vehicle inner side Y of the tire centerline CL, the distance between a first circumferential auxiliary groove 15e on the tire centerline CL side and the tire centerline CL is the same as the distance between a second circumferential auxiliary groove 15f on the tire centerline CL side and the tire centerline CL. Moreover, among the two circumferential auxiliary grooves 15d and 15e that are formed on the vehicle outer side X of the tire centerline CL and among the two circumferential auxiliary grooves 15f and 15g that are formed on the vehicle inner side Y of the tire centerline CL, the distance between a third circumferential auxiliary groove 15d on the vehicle outer side X and the tire centerline CL is the same as the distance between a fourth circumferential auxiliary groove 15g on the vehicle inner side Y and the tire centerline CL.

Also, in the present embodiment, among both side faces 15a and 15b that constitute each circumferential auxiliary groove 15, the one side face 15a that is positioned on the tire centerline CL side extends along the normal direction of the tread surface portion 10a or is inclined by 5° or less to the tire centerline CL side with respect to the normal line direction. The other side face 15b positioned on the side opposite the centerline is inclined by 10° to 30° to the side opposite the centerline side with respect to the normal direction. Note that the circumferential auxiliary groove 15, as shown in FIG. 2 and FIG. 3, is defined by the two side faces 15a and 15b mentioned above, and a bottom face 15c that connects the side faces 15a and 15b. The width of this circumferential auxiliary groove 15 gradually increases while heading from the bottom face 15c to the tread surface portion 10a.

Furthermore, in the tread surface portion 10a, the width direction of the third circumferential auxiliary groove 15d is greater than the respective width dimensions of the first circumferential auxiliary groove 15e, the second circumferential auxiliary groove 15f and the fourth circumferential auxiliary groove 15g. Also, in the tread surface portion 10a, the width direction of the fourth circumferential auxiliary groove 15g is equal to or greater than the respective width dimensions of the first circumferential auxiliary groove 15e and the second circumferential auxiliary groove 15f and is smaller than the width dimension of the third circumferential auxiliary groove 15d.

Here, the circumferential main groove 11, similarly to the circumferential auxiliary groove 15, is defined by both side faces 11a and 11b and a bottom face 11c that connects these side faces 11a and 11b. The inclination angles of both side faces 11a and 11b with respect to the normal direction are the same so that the shape in cross-sectional view is axis symmetric with respect to the center line that passes through the central portion in the width direction of the circumferential main groove 11 and extends along the normal direction, and the width thereof gradually increases from the bottom face 11c to the tread surface portion 10a.

The width dimension of the third circumferential auxiliary groove 15d in the tread surface portion 10a is smaller than the width dimension of the center circumferential main groove 11 in the tread surface portion 10a.

As described above, with the pneumatic tire 10 of the present embodiment, during turning travel on a snowy road, by making the snow enter the circumferential auxiliary groove 15 from the other side face 15b and not causing this snow to pass from the one side face 15a to the outside, easily pressing the snow against the one side face 15a becomes possible, and it becomes possible to easily fill the circumferential auxiliary groove 15 with snow and harden it. Accordingly, during turning travel on a snowy road, at the snow surface with which the tread surface portion 10a makes contact, it becomes possible to form a snow pillar that bites into the circumferential auxiliary groove 15, and so it is possible to raise the grip force of the tread surface portion 10a with respect to the snowy road.

Moreover, the circumferential auxiliary groove 15 is provided with the side faces 15a and 15b, and the width of the circumferential auxiliary groove 15 gradually narrows from the tread surface portion 10a to the bottom face 15c. Accordingly, the snow that enters as described above is compressed and hardened in the process of penetrating toward the bottom face 15c, and so hardening the snow pillar becomes possible and it is possible to reliably increase the grip force.

Moreover, in this way the circumferential auxiliary groove 15 is provided with the side faces 15a and 15b, and the width of this circumferential auxiliary groove 15 gradually increases from the bottom face 15c to the tread surface portion 10a. Accordingly, by causing for example centrifugal force or the like to act on the snow pillar that bites into this circumferential auxiliary groove 15 when the tread surface portion 10a has separated from the snowy road, it becomes possible to easily extract the snow pillar from the circumferential auxiliary groove 15. Accordingly, it becomes possible to prevent the circumferential auxiliary groove 15 from easily clogging, and so even during travel on a snowy road over a long period, the aforementioned effect is continuously exhibited during this travel.

Furthermore, since the circumferential auxiliary groove 15 is provided with the other side face 15b, by forming the circumferential auxiliary groove 15 in the land portion row 14, it is possible to suppress a reduction in the rigidity of this land portion row 14. Additionally, the shear strength at the coupling portion of the snow pillar with the snow surface is efficiently raised without excessively enlarging the volume of the circumferential auxiliary groove 15. Accordingly, even if the reduction in the ground contact area of the tread surface portion 10 with a dry road surface is suppressed by limiting the number of the circumferential auxiliary grooves 15 and making the width dimension and depth dimension thereof smaller than the circumferential main groove 11, the aforementioned effect can be exhibited.

Thereby, it is possible to improve the turning performance on snowy roads without reducing the steering stability or quietness during travel on a dry road surface.

Moreover, in the present embodiment, since the circumferential auxiliary groove 15 is also formed in the outer side land portion row 14a that most easily slips sideways in the tread surface portion 10a during turning on a snowy road, the aforementioned effect is prominently exhibited.

Note that when the above pneumatic tire 10 is attached to driven wheels to which chains are not attached during travel on snowy roads, the aforementioned effect is even more prominently exhibited.

Note that the technical scope of the present invention is not limited to the aforementioned embodiment, and various modifications can be made within the scope of not departing from the spirit or scope of the present invention.

For example, in the embodiment, the circumferential auxiliary groove 15 was formed in all of the plurality of land portion rows 14 provided in the tread surface portion 10a, but instead it may be formed in at least one among these land portion rows 14.

Also, the tread pattern that is formed on the tread surface portion 10a is not limited to the example illustrated, and may be suitably modified. For example, one of the plurality of land portion rows 14 formed on the tread surface portion 10a may be arranged on the tire centerline CL, and the circumferential auxiliary groove 15 may be formed in this center land portion row 14. In this case, the circumferential auxiliary groove 15 is formed at a position in the center land portion row 14 that avoids the tire centerline CL. Namely, the circumferential auxiliary groove 15 may be formed in the center land portion row 14 in the state of either end thereof among both ends of the circumferential auxiliary groove 15 in the tire width direction H being positioned on the tire center line CL, or the circumferential auxiliary groove 15 may be formed at a position in the center land portion row 14 that is separate from the tire centerline CL. That is, the circumferential auxiliary groove 15 may be formed in the center land portion row 14 so as not to straddle the tire centerline CL in the tire width direction H.

Also, all of the circumferential main grooves 11 may have the same width.

Next, verification testing of the operational advantage described above was carried out.

First, the pneumatic tires supplied to this test shall be described. For the pneumatic tire 10, eight types of pneumatic tires were adopted in which only the width dimension A of the circumferential auxiliary groove 15 in the tread surface portion 10*a*, the depth dimension B of the circumferential auxiliary groove 15, and the angle θ that the other side face 15*b* forms with the normal direction on the side opposite the tire centerline side are varied as shown in Table 1, with the other portions being standardized.

Note that the one side face 15*a* of each circumferential auxiliary groove in all eight types of pneumatic tires is made to extend along the normal direction. Also, among the plurality of circumferential main grooves 11 that are formed in the tread surface portion 10*a*, the width of the center circumferential main groove 11 at the tread surface portion 10*a* is 9.5 mm while the depth thereof is 7.6 mm. Moreover, the width of the two circumferential main grooves 11 at the tread surface portion 10*a* is 9.6 mm while the depth thereof is 7.6 mm.

TABLE 1

| | Circumferential auxiliary groove | Width A (mm) | Depth B (mm) | Angle θ (°) |
|---|---|---|---|---|
| Embodiment 1 | 15d | 4.6 | 3.5 | 25 |
| | 15e | 2.1 | 3.5 | 3 |
| | 15f | 2.1 | 3.5 | 3 |
| | 15g | 3.1 | 3.5 | 5 |
| Embodiment 2 | 15d | 4.6 | 3.5 | 25 |
| | 15e | 3.8 | 4.1 | 25 |
| | 15f | 2.1 | 3.5 | 3 |
| | 15g | 3.1 | 3.5 | 5 |
| Embodiment 3 | 15d | 4.6 | 3.5 | 25 |
| | 15e | 3.8 | 4.1 | 25 |
| | 15f | 3.8 | 4.1 | 25 |
| | 15g | 3.8 | 3.5 | 25 |
| Comparative Example 1 | 15d | 3.1 | 3.5 | 5 |
| | 15e | 2.1 | 3.5 | 3 |
| | 15f | 2.1 | 3.5 | 3 |
| | 15g | 3.1 | 3.5 | 5 |
| Comparative Example 2 | 15d | 5.1 | 3.5 | 5 |
| | 15e | 2.1 | 3.5 | 3 |
| | 15f | 2.1 | 3.5 | 3 |
| | 15g | 3.1 | 3.5 | 5 |
| Comparative Example 3 | 15d | 5.1 | 4.5 | 5 |
| | 15e | 2.1 | 3.5 | 3 |
| | 15f | 2.1 | 3.5 | 3 |
| | 15g | 3.1 | 3.5 | 5 |
| Comparative Example 4 | 15d | 5.1 | 4.5 | 5 |
| | 15e | 4.1 | 4.5 | 3 |
| | 15f | 2.1 | 3.5 | 3 |
| | 15g | 3.1 | 3.5 | 5 |
| Comparative Example 5 | 15d | 5.1 | 4.5 | 5 |
| | 15e | 4.1 | 4.5 | 3 |
| | 15f | 4.1 | 4.5 | 3 |
| | 15g | 4.1 | 4.5 | 5 |

Also, the size of each pneumatic tire is 205/60R16, with each pneumatic tire mounted on a rim with a size of 6.5JJ×16, and then installed on a vehicle with an inflation pressure of approximately 220 kPa. The turning performance on snowy roads, straight line stability on dry surface roads, and quietness were evaluated as indexes based on driver feeling.

The results are shown in Table 2. Note that in this table, the higher the number in each evaluation item, the better the performance.

TABLE 2

| | Snowy Road | Dry Road Surface | |
|---|---|---|---|
| | Turning Performance | Steering Stability | Quietness |
| Embodiment 1 | 6.3 | 7 | 7 |
| Embodiment 2 | 6.5 | 6.7 | 6.7 |
| Embodiment 3 | 7.3 | 6.5 | 6.5 |
| Comparative Example 1 | 5.5 | 7 | 7 |
| Comparative Example 2 | 5.8 | 6.7 | 6.7 |
| Comparative Example 3 | 5.7 | 6.5 | 6.5 |
| Comparative Example 4 | 6.3 | 6.3 | 6.3 |
| Comparative Example 5 | 6.8 | 5.5 | 5.5 |

By this result, it was confirmed that with the pneumatic tire of the embodiment, it is possible to improve the turning performance on snowy roads without decreasing the steering stability or quietness during travel on a dry road surface.

INDUSTRIAL APPLICABILITY

According to the present invention, it is possible to improve the turning performance on snowy roads without decreasing the steering stability or quietness during travel on a dry road surface.

The invention claimed is:

1. A pneumatic tire in which a plurality of circumferential main grooves that extend in the tire circumferential direction are formed in a tread surface portion, and a plurality of land portion rows are partitioned by the circumferential main grooves,
   wherein in at least one of the plurality of the land portion rows a circumferential auxiliary groove extending in the tire circumferential direction and having a narrower width and shallower depth than those of the circumferential main grooves is formed in a position avoiding the tire centerline,
   among both side faces defining the circumferential auxiliary groove, one side face on the tire centerline side extends along the normal direction of the tread surface portion or is inclined to the tire centerline side by 5° or less with respect to the normal direction, and the other side face on the side opposite to the tire centerline side is inclined to the side opposite to the tire centerline side by 10° to 30° with respect to the normal direction,
   the incline of the other side face of the circumferential auxiliary groove extending continuously from a bottom face of the circumferential auxiliary groove to the tread surface portion, and
   an inclination angle of each side face of the circumferential main grooves is the same.

2. The pneumatic tire according to claim 1, wherein a tread pattern formed by the circumferential main grooves and lateral grooves on the tread surface portion is asymmetrical about the tire centerline, and
   among the plurality of land portion rows, the circumferential auxiliary groove is formed in at least an outer side land portion row that is disposed on a vehicle outer side of the tire centerline.

3. The pneumatic tire according to claim 1, further comprising a plurality of circumferential auxiliary grooves, a width of one of the circumferential auxiliary grooves, at the tread surface portion, is wider than a width of the remaining circumferential auxiliary grooves at the tread surface portion.

* * * * *